(12) United States Patent
Higgs et al.

(10) Patent No.: US 10,866,602 B1
(45) Date of Patent: Dec. 15, 2020

(54) CONTROLLING COMMUNICATIONS USING TEMPERATURE AND/OR RADIO-FREQUENCY (RF) SIGNALS

(71) Applicant: Securus Technologies, Inc., Carrollton, TX (US)

(72) Inventors: Joseph Higgs, Fort Worth, TX (US); Adam C. Edwards, Fort Worth, TX (US)

(73) Assignee: Securus Technologies, LLC, Carrollton, TX (US)

( * ) Notice: Subject to any disclaimer, the term of this patent is extended or adjusted under 35 U.S.C. 154(b) by 234 days.

(21) Appl. No.: 15/970,402

(22) Filed: May 3, 2018

Related U.S. Application Data

(63) Continuation of application No. 13/605,713, filed on Sep. 6, 2012, now Pat. No. 9,964,969.

(51) Int. Cl.
G05D 23/00 (2006.01)

(52) U.S. Cl.
CPC .................. *G05D 23/00* (2013.01)

(58) Field of Classification Search
CPC ..................................................... G05D 23/00
See application file for complete search history.

(56) References Cited

U.S. PATENT DOCUMENTS

2009/0322513 A1* 12/2009 Hwang ............. A61B 5/02055
340/539.12

* cited by examiner

Primary Examiner — Tejal Gami
(74) Attorney, Agent, or Firm — Fogarty LLP

(57) ABSTRACT

Systems and methods of controlling communications using temperature and/or Radio Frequency (RF) signals are disclosed. In some embodiments, a method may include determining whether a user operating a communications device has at least temporarily transferred at least partial control of the communications device to another user based, at least in part, upon a change in at least one of: a temperature or an RF signal sensed at the communications device. The method may also include controlling an aspect of a communication conducted via the communications device based, at least in part, upon the determination.

20 Claims, 6 Drawing Sheets

CONTROLLING COMMUNICATIONS USING TEMPERATURE AND/OR RADIO-FREQUENCY (RF) SIGNALS

CROSS REFERENCE TO RELATED APPLICATIONS

This patent application claims priority to, and is a continuation of, U.S. patent application Ser. No. 13/605,713 filed on Sep. 6, 2012 and titled "Controlling Communications Using Temperature and/or Radio-Frequency (RF) Signals" and issued on May 8, 2018 as U.S. Pat. No. 9,964,969 which is herein incorporated by reference.

TECHNICAL FIELD

This specification relates generally to communications, and, more particularly, to systems and methods of controlling communications using temperature and/or Radio Frequency (RF) signals.

BACKGROUND

It is typical for residents (e.g., inmates, etc.) of controlled-environment facilities (e.g., prisons, etc.) to attempt to circumvent the facility's security procedures. For example, with respect to telephone communications, the inventors hereof have discovered situations where an inmate may initiate a call and then turn the handset over to another inmate, who then participates in the call. Such a simple action can bypass even some of the most advanced call controls otherwise put in place through the use of personal identification numbers (PINs), personal allowed number (PAN) lists, and/or costly biometric verification procedures that are executed upon establishment of the call.

In practice, as the inventors hereof have also recognized, controlled-environment facilities generally have great difficulty in identifying situations where such telephone sharing occurred, and therefore are hindered in their ability to prevent or investigate those communications. For these and other reasons, the inventors hereof have developed various systems and methods of controlling communications using temperature and/or Radio Frequency (RF) signals as described herein.

SUMMARY

Embodiments disclosed herein are directed to systems and methods of controlling communications using temperature and/or Radio Frequency (RF) signals. In an illustrative, non-limiting embodiment, a method may include determining whether a user operating a communications device has at least temporarily transferred at least partial control of the communications device to another user based, at least in part, upon a temperature sensed at the communications device, and controlling an aspect of a communication conducted via the communications device based, at least in part, upon the determination. For example, the user may be an inmate within a correctional facility, and the communications device is disposed within the correctional facility. The communications device may be a telephone, a mobile phone, a computer, a tablet, a kiosk, or a visitation station.

In various implementations, the method may include sensing a first temperature at a first time during the communication, sensing a second temperature at a second time during the communication, comparing a difference between the first and second temperatures against one or more temperature thresholds, comparing a difference between the first and second times against one or more time thresholds, and determining whether the user has at least temporarily transferred at least partial control of the communications device to the other user based upon the comparisons. Additionally or alternatively, the method may include periodically sensing the temperature during the communication, matching the periodically sensed temperature to one or more temperature curves indicating a normal behavior, and determining that the user has not transferred control of the communications device to the other user based upon the match. Additionally or alternatively, the method may include periodically sensing the temperature during the communication, matching the periodically sensed temperature to one or more temperature curves indicating an abnormal behavior, and determining that the user has at least temporarily transferred at least partial control of the communications device to the other user based upon the match.

In some implementations, the method may include sensing the temperature during the communication, matching the sensed temperature to one or more user temperature profiles, and identifying the user, at least in part, based upon the match. Additionally or alternatively, the method may include sensing the temperature during the communication and determining that the user has a fever, at least in part, based upon the sensed temperature. Additionally or alternatively, the method may include sensing the temperature during the communication and determining a level of stress of the user, at least in part, based upon the sensed temperature.

The method may include controlling the aspect of the communication: terminating the communication, flagging the communication for later investigation, recording the communication, and/or live-monitoring the communication. Moreover, the method may include determining whether the user has at least temporarily transferred at least partial control of the communications device to the other user based, at least in part, upon an RF signal sensed at the communications device detected via one or more RF sensing apparatuses configured to interact with an electromagnetic field produced by one or more RF emitting apparatuses physically coupled to the inmate, where the one or more RF sensing apparatuses include one or more RF antennas, and where the one or more RF emitting apparatus include one or more RF Identification (RFID) tags, bracelets, or anklets.

In another illustrative, non-limiting embodiment, a method may include determining whether an inmate operating a communications device within a correctional facility has handed off the communications device to another inmate based, at least in part, upon a change in at least one of: a temperature or an RF signal sensed at the communications device. In some cases, the temperature sensed at the communications device may be detected via one or more temperature sensing apparatuses physically coupled to the communications device and configured to be thermally coupled to the inmate during operation of the communications device. For example, the one or more temperature sensing apparatuses may include at least one of a thermistor, thermocouple, pyrometer, or infrared thermometer, and one or more of the temperature sensing apparatuses may be installed in the communications device's handset, earpiece, mouthpiece, or enclosure.

Additionally or alternatively, the RF signal may be sensed at the communications device as detected via one or more RF sensing apparatuses configured to interact with an electromagnetic field produced by one or more RF emitting apparatuses physically coupled to the inmate. For example, the one or more RF sensing apparatuses may include one or more RF antennas, and the one or more RF emitting apparatus may include one or more RF Identification (RFID) tags, bracelets, or anklets.

In yet another illustrative, non-limiting embodiment, a method may include determining whether a user operating a communications device has at least temporarily transferred at least partial control of the communications device to another user based, at least in part, upon a change in a detected RF signal. The RF signal may be sensed at the device as detected via one or more RF sensing apparatuses configured to interact with an electromagnetic field produced by one or more RF emitting apparatuses physically coupled to the inmate, where the one or more RF sensing apparatuses include one or more antennas, and where the one or more RF emitting apparatus include one or more RF Identification (RFID) tags, bracelets, or anklets.

The method may also include determining whether the user has at least temporarily transferred at least partial control of the communications device to the other user based, at least in part, upon a change in a temperature detected via one or more temperature sensing apparatuses physically coupled to the communications device and configured to be thermally coupled to the inmate during operation of the communications device, where the one or more temperature sensing apparatuses include at least one of a thermistor, thermocouple, pyrometer, or infrared thermometer, and where one or more of the temperature sensing apparatuses are installed in the communications device's handset, earpiece, mouthpiece, or enclosure.

The method may then include, in response to the change in the detected RF signal being smaller than a threshold value, allowing an ongoing communication to continue. Conversely, in response to the change in the detected RF signal being greater than a threshold value, the method may cause at least one of: termination the communication, recording of the communication, or live-monitoring of the communication. In some cases, the threshold value may be retrieved from a database of threshold values, each corresponding to a different user, and where the retrieved threshold value may be proportional to a physical attribute of the user.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods of controlling communications using temperature and/or Radio Frequency (RF) signals. Generally speaking, the various techniques described herein may find applicability in a wide variety of controlled-environment facilities. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled-environment facility may be referred to as a jail or prison, and its residents may be referred to as users, residents, arrestees, detainees, or inmates. It should be understood, however, that the systems and methods described herein may be similarly applicable to other types of controlled-environment facilities and their respective residents (e.g., a hospital and its patients).

Figure 1:
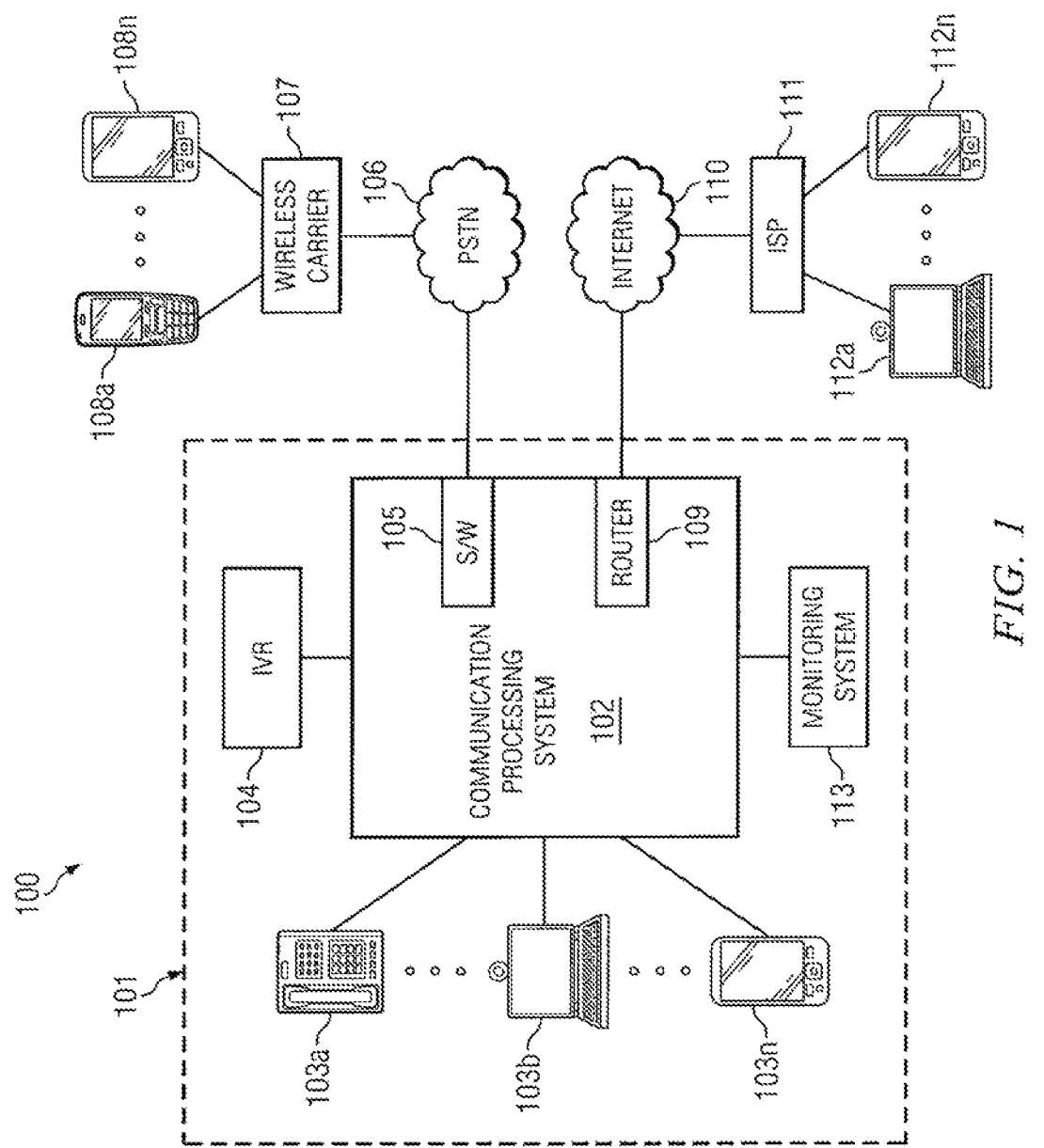
FIG. 1 is a diagram of communication and monitoring systems deployed within a controlled-environment facility according to some embodiments.

Turning now to FIG. 1, a diagram of communication processing system 102 and monitoring system 113 deployed within controlled-environment facility 101 is depicted. A typical resident (e.g., an inmate) of controlled-environment facility 101 (e.g., a jail or prison) may reside within an assigned area (e.g., a jail cell), and may occasionally or periodically be given access to common areas within facility 101. Examples of common areas include, but are not limited to, visitation rooms, cafeteria, kitchen, outdoor/exercise areas, etc. Facility 101 may also include one or more administration areas (e.g., offices, security area(s), information technology (IT) rooms, etc.) generally occupied by prison staff, prison administration, emergency response personnel, law enforcement agents, etc. In some embodiments, one or more of the various areas within facility 101 may be equipped with one or more communications devices 103*a-n*.

Examples of communications devices 103*a-n* include, but are not limited to, analog or digital telephones, computing devices, tablets, Voice-over-IP (VOIP) devices, cell phones, video communication or remote visitation devices, etc. In some cases, these devices may be provided within a pod, module, cell, wing, service kiosk, visitation area, etc. that is generally accessible to inmates. As illustrated, one or more of communications devices 103*a-n* may be coupled to communication processing system 102, which serves facility 101 and may be configured to provide voice and data services to inmates (and/or prison administration), such as, for example, voice, data, video, Internet access, etc. As shown in FIG. 1, communication processing system 102 may be physically disposed within facility 101. In alternative embodiments, however, one or more of elements of communication processing system 102 may be located outside of facility 101 (e.g., serving two or more distinct facilities).

In various implementations, communication processing system 102 may include conventional wired and/or wireless connectivity options, routing or switching capabilities, analog and digital voice interfaces, etc. For example, communication processing system 102 may be operably coupled to switch 105 and router 109. Particularly, switch 105 may allow communication processing system 102 to establish a remote communication between an inmate operating one of communications devices 103*a-n* within facility 101 and a non-resident of facility 101 (e.g., a family member, friend, attorney, etc.) operating one or more communication devices 108*a-n* outside of facility 101 through Public Switched Telephone Network (PSTN) 106 and via wireless carrier 107. For example, PSTN 106 may include telephone lines, fiber optic cables, microwave transmission links, cellular networks (e.g., third generation (3G), fourth generation (4G), Long Term Evolution (LTE) wireless networks, etc.), communications satellites, undersea telephone cables, switching centers, or the like.

Meanwhile, router 109 allows communication processing system 102 to establish a remote communication between an inmate operating one of communications devices 103*a-n* within facility 101 and a non-resident of facility 101 (e.g., a family member, friend, attorney, etc.) operating one or more communication devices 112*a-n* outside of facility 101 through Internet 110 and via Internet Service Provider 111. For example, Internet 110 may include any computer network or the like employing any suitable communication protocol (e.g., Internet Protocol or "IP" protocol). Moreover, mobile devices 103*a-n* and/or 112*a-n* include, but are not limited to, analog or digital telephones, computing devices, tablets, Voice-over-IP (VOIP) devices, cell phones, wireless phones, smart phones, video communication devices, mobile video and/or audio communications devices, etc.

Figure 3A:
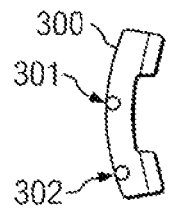
FIGS. 3A-C are diagrams of temperature and/or Radio Frequency (RF) sensors deployed in various communication devices according to some embodiments.
Figure 3B:
Figure 3C:
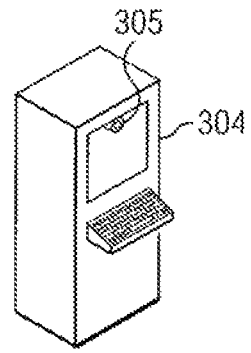
Figure 4:
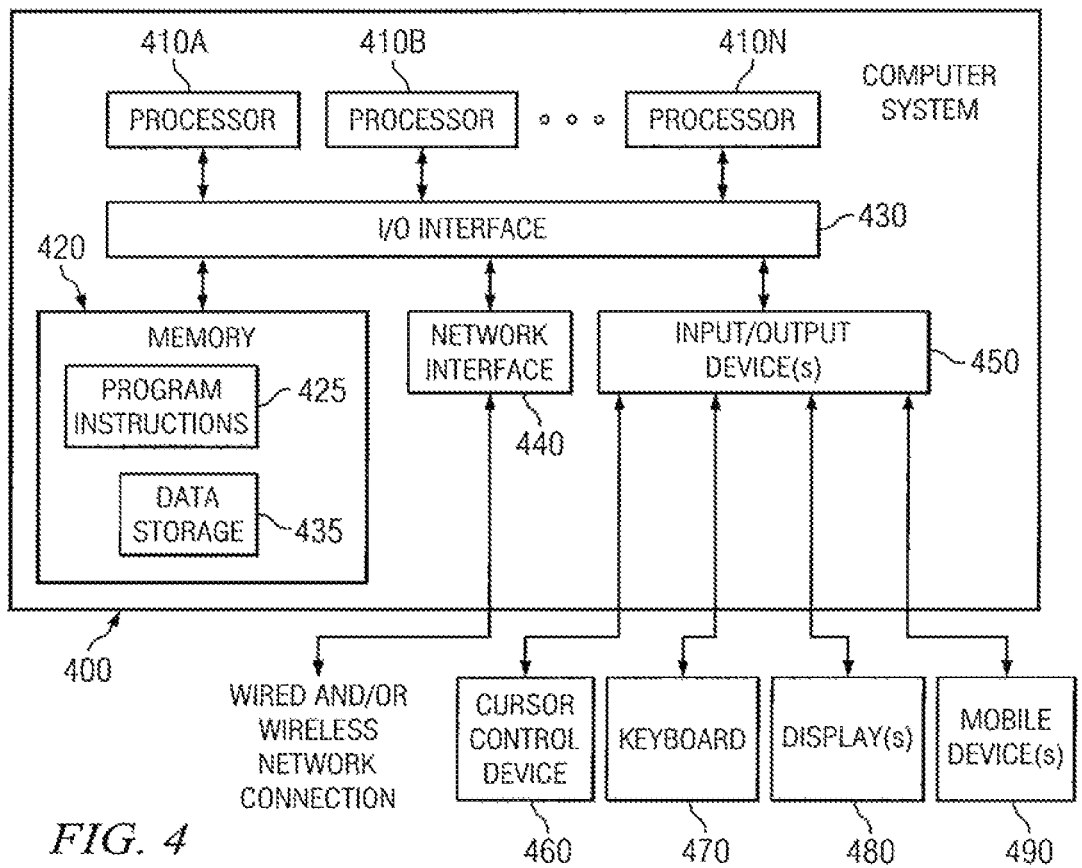
FIG. 4 is a block diagram of a computer system configured to implement various systems and methods described herein according to some embodiments.
Figure 5A:
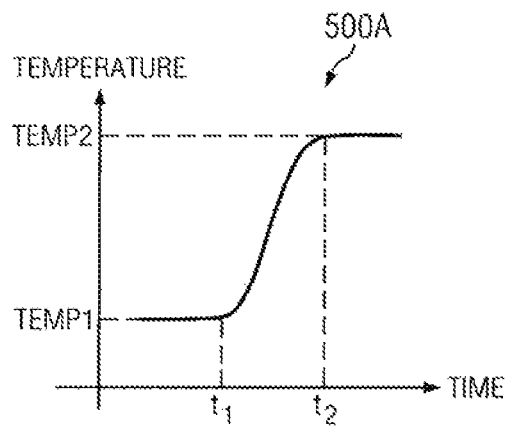
FIGS. 5A-D are graphs illustrating examples of temperature curves indicative of normal behavior according to some embodiments.
Figure 5B:
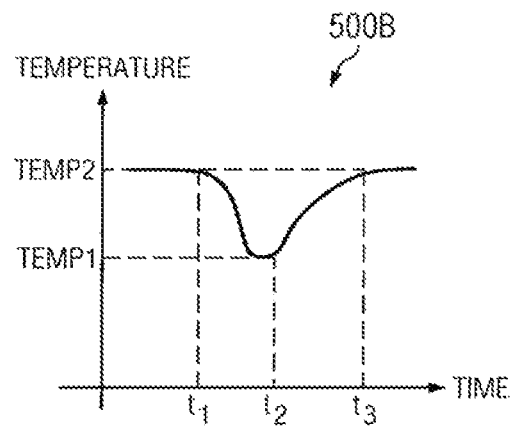
Figure 5C:
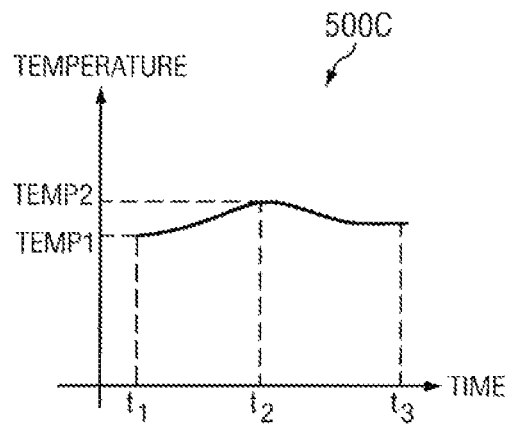
Figure 5D:
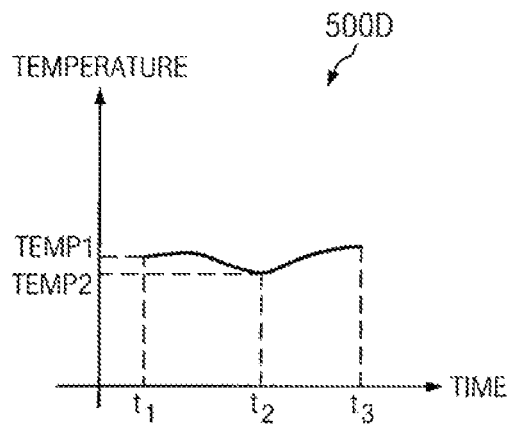

Interactive Voice Response (IVR) system 104 may be configured to generate and play prompts or other messages to inmates and/or non-residents participating in communications through communication processing system 102, and to receive responses from the inmates (e.g., verbally, using Dual-Tone Multi-Frequency or "DTMF" tones, etc.). Monitoring system 113 may also be operably coupled to communication processing system 102. In some implementations, one or more elements of monitoring system 113 may be embedded into communication processing system 102 or communication devices 103*a-n*. In other implementations, one or more elements of monitoring system 113 may be located outside of facility 101 (e.g., serving two or more distinct facilities). Examples of monitoring system 113 are shown in FIGS. 2-4, and aspects of their operation are described in FIGS. 5-8.

In various embodiments, the system(s) shown in FIG. 1 may be used to provide communication control using temperature and/or Radio Frequency (RF) signals. For example, in some cases, by monitoring the body temperature of one or more residents or users operating communication devices 103*a-n*, the system(s) of FIG. 1 may be capable of determining, for instance, whether a first resident has handed over control of the communication device to a second resident during an ongoing call or communication—after the first resident has authenticated his identity, thus allowing the second resident to circumvent one or more other security procedures. Additionally or alternatively, by monitoring the signal strength of an RF device attached to the user, the system(s) of FIG. 1 may be capable of determining whether a resident has stepped away from the communication device during the call—therefore allowing another unidentified and/or unauthenticated resident to take over the call or communication. Accordingly, in certain implementations, the system(s) of FIG. 1 may be configured to cause a call control operation to be performed in response to detected abnormal behavior such as, for example, termination of the communication, recording of the communication (e.g., audio recording, transcripts, etc.), live-monitoring of the communication, flagging of the communication for subsequent investigation, etc.

Figure 2:
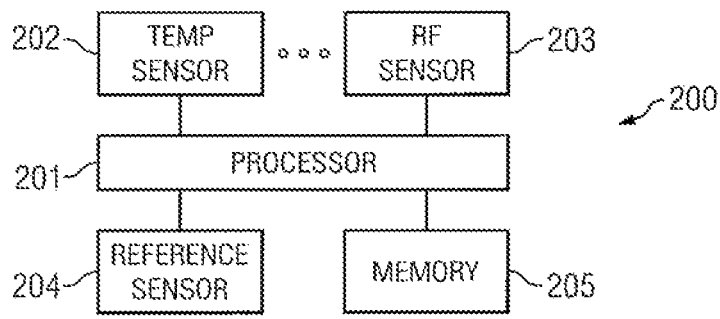
FIG. 2 is a block diagram of a monitoring apparatus according to some embodiments.

FIG. 2 is a block diagram of monitoring apparatus 200. As illustrated, processor 201 is operably coupled to one or more temperature sensor(s) 202, one or more RF sensor(s) 203, one or more reference sensor(s) 204, and memory 205. In some embodiments, processor 201 and memory 205 may be a part of monitoring system 113 of FIG. 1. Meanwhile, sensor(s) 202-204 may be disposed within one or more communication devices 103*a-n* and/or throughout controlled-environment facility 101. In other embodiments, however, processor 201 and/or memory 205 may be embedded or integrated into communication devices 103*a-n*. Examples of sensor(s) 202-204 disposed within communication device(s) 103*a-n* are shown in FIGS. 3A-C. Although both temperature and RF sensors are shown in FIG. 2, it should be noted that, in temperature-only implementations, RF sensor(s) 203 may be absent. Conversely, in RF-only implementations, temperature sensor(s) 202 may be absent.

Temperature sensor(s) 202 may include any suitable type of temperature sensor such as, for example, thermometers, thermistors, thermocouples, pyrometers, infrared thermometers, or the like. Meanwhile, RF sensor(s) 203 may include any suitable type of RF sensors such as, for example, antennas, electromagnetic transducers, RF Identification (RFID) readers, Near Field Communication (NFC) sensors, etc. Generally speaking, sensor(s) 202 and/or 203 may also include analog circuitry (e.g., amplifiers, analog filters, etc.) and/or digital circuitry (e.g., samplers, digitizers, etc.) configured to process detected temperature and/or RF signals prior to providing those signals to processor 201. Additionally or alternatively, such circuitry may be integrated into processor 201. Reference sensor(s) 204 may be used in some implementations to provide a baseline temperature and/or RF signal strength against which signals obtained from sensors 202 and/or 203 are measured, for example, for calibration purposes. In the case of temperature monitoring, reference sensor(s) 204 may be similar to sensor(s) 202 but configured to measure an ambient temperature. Similarly, in the case of RF monitoring, reference sensor(s) 204 may be similar to sensor(s) 203, but configured to measure an RF field in the absence of an RF emitting device (e.g., an RFID or NFC chip, tag, bracelet, anklet, etc.) worn or otherwise used by a user. When sensor(s) 202 and/or 203 are pre-calibrated, however, reference sensor 204 may be absent.

In operation, processor 201 may receive one or more signals from temperature sensor(s) 202 and perform one or more algorithms to determine, for example, whether a user different from the user whom initiated operation of one of devices 103a-n has taken over an ongoing communication, as discussed in connection with FIGS. 5A-D, 6A-D, and 8. Additionally or alternatively, processor 201 may determine whether the sensed temperature matches one or more user temperature profiles (e.g., stored in memory 205), and it may identify the user based on the match. Additionally or alternatively, processor 201 may determine whether the user has a fever (e.g., above the range of 36.5-37.5° C. or 98-100° F.). Additionally or alternatively, processor 201 may determine a level of stress of the user (e.g., increases and/or decreases in body temperature may indicate upsetting or stressful communications). In response to these determinations, processor 201 may perform or cause one or more operations to be performed. For example, processor 201 may cause a message to be sent to medical personnel indicating the possibility that the user is sick or has a fever, it may flag the communication for subsequent investigation in response to the detection of a high-stress communication, and/or it may perform one or more call control operations (e.g., terminate the call, record the call, live-monitor the call, etc.).

Additionally or alternatively, processor 201 may receive one or more signals from RF sensor(s) 203 and may perform one or more algorithms to determine, for example, whether a user whom initiated operation of one of devices 103a-n has physically moved away from the device while a communication is taking place, as discussed in connection with FIGS. 7A, 7B, and 8. Accordingly, processor 201 may also be programmed to perform or cause one or more call control operations to be performed in response to the foregoing determination(s).

In some cases, a temperature or RF signal profile may be stored for each resident of the controlled-environment facility. For instance, in the context of a correctional facility, each inmate may have a corresponding temperature profile stored in memory 205. The profile may be obtained, for example, as the result of a number of average temperature measurements taken during one or more control calls (e.g., where the inmate is known to have operated the communication device properly and without having passed control of the communication device to another inmate). Similarly, an RF signal profile may be obtained by measuring the signal strength of an RFID or NFC device attached to or worn by the inmate during one or more control calls and then storing it into memory 205. Generally speaking, the RF signal received by sensor 203 may be proportional to a physical attribute of the user (e.g., height, arm length, leg length, etc.), depending upon where in the user's body the RF device is attached. In some embodiments, each inmate temperature and/or RF profile may be associated with a margin of uncertainty that is the result of normal variations in temperature or RF field during a typical communication (e.g., the user may grab a telephone handset in different ways during the call, may change hands during the call, may sit down or stand up during the call thus changing the distance between the RF device and RF sensor, etc.).

Implementations of processor 201 may include, but are not limited to, application specific integrated circuits (ASICs), system-on-chip (SoC) circuits, digital signal processors (DSPs), field-programmable gate arrays (FPGAs), processors, microprocessors, controllers, microcontrollers (MCUs), or the like. Memory 205 may include any tangible memory apparatus, circuit, or device which, in some cases, may be integrated within processor 201 as one chip. For example, memory 205 may include registers, Static Random Access Memory (SRAM), Magnetoresistive RAM (MRAM), Nonvolatile RAM (NVRAM, such as "flash" memory), and/or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. Additionally or alternatively, processor 201 and/or memory 205 may be implemented, at least in part, as computing device 400 shown in FIG. 4.

In some embodiments, the modules or blocks shown in FIG. 2 may represent processing circuitry and/or sets of software routines, logic functions, and/or data structures that, when executed by a processor, perform specified operations. Although these modules are shown as distinct logical blocks, in other embodiments at least some of the operations performed by these modules may be combined into fewer blocks. For example, in some cases, memory 205 may be combined with processor 201. Conversely, any given one of modules 201-205 may be implemented such that its operations are divided among two or more logical blocks. Although shown with a particular configuration, in other embodiments these various modules or blocks may be rearranged in other suitable ways.

FIGS. 3A-C are diagrams of temperature and/or RF sensors deployed in various communication devices according to some embodiments. Particularly, FIG. 3A shows telephone handset 300 with two temperature or RF sensors 301 and 302 located in the middle portion and near the extremity of handset 300's enclosure, respectively. In some cases, sensors 301 and/or 302 may be integrated within the earpiece or mouthpiece portions of such device. Furthermore, although two sensors 301 and 302 are shown, it should be understood that any suitable number of sensors may be deployed depending upon the particular application. FIG. 3B shows communication device 103b adapted with an external sensor 303 coupled to device 103b. In some cases, device 103b may be configured such that a communication may only be initiated and/or conducted in response to a user physically touching sensor 303 (e.g., with contact by user's finger or hand). In other cases, device 303 may include an adhesive patch that allows it to be temporarily attached to the user's skin in order to allow a communication to take place. FIG. 3C shows a kiosk or remote visitation station 304 with sensor 305. For temperature-monitoring applications, sensor 305 may include an IR temperature gun or the like, aimed at the user (e.g., in the same direction as a camera in the case of a video conference device).

It will be understood by a person of ordinary skill in the art in light of this disclosure that the embodiments shown in FIGS. 3A-C are provided only for sake or illustration and not by way of limitation. In fact, numerous other sensor deployment techniques may be appropriate to any given monitoring application, for example, depending upon the number and type of sensors, the type of communication device, the environment or room where the particular communication device is located, etc.

As noted above, embodiments of systems and methods of controlling communications using temperature and/or RF signals may be implemented or executed, at least in part, by one or more computer systems. One such system is illustrated in FIG. 4. In various embodiments, system 400 may be a server, a workstation, a desktop computer, a laptop, a tablet computer, a mobile device, a smart phone, or the like. In some cases, system 400 may be used to implement monitoring system 113 and/or one or more of devices 103a-n, 108a-n, and/or 112a-n. As illustrated, computer system 400 includes one or more processors 410A-N coupled to a system memory 420 via an input/output (I/O) interface 430. Computer system 400 further includes a network interface 440 coupled to I/O interface 430, and one or more input/output devices 450, such as cursor control device 460, keyboard 470, display(s) 480, or mobile device(s) 490. Other devices may include, for example, sensors 202-204, surveillance cameras, microphones, mobile phone detection modules, etc. In some embodiments, each of monitoring system 113 and/or one or more of devices 103a-n, 108a-n, and/or 112a-n may be implemented using a single instance of computer system 400, while in other embodiments multiple such systems, or multiple nodes making up computer system 400, may be configured to host different portions of a given electronic device or system.

In various embodiments, computer system 400 may be a single-processor system including one processor 410A-N (e.g., processor 201 shown in FIG. 2), or a multi-processor system including two or more processors 410A-N (e.g., two, four, eight, or another suitable number). Processors 410 may be any processor capable of executing program instructions. For example, in various embodiments, processors 410A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410A-N may commonly, but not necessarily, implement the same ISA. Also, in some embodiments, at least one processor 410A-N may be a graphics processing unit (GPU) or other dedicated graphics-rendering device.

System memory 420 (e.g., memory 205 shown in FIG. 2) may be configured to store program instructions and/or data accessible by processor(s) 410A-N. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 5-10, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include any tangible storage media or memory media such as electronic, magnetic, or optical media—e.g., disk or CD/DVD-ROM coupled to computer system 400 via I/O interface 430. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 430 may be configured to coordinate I/O traffic between processor(s) 410A-N, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor(s) 410A-N). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, mobile devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 425, configured to implement certain embodiments described herein, and data storage 435, comprising various data may be accessible by program instructions 425. In an embodiment, program instructions 425 may include software elements of embodiments illustrated in the above figures. For example, program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIGS. 5A-D are graphs illustrating examples of normal temperature curves. In some embodiments, temperature curves 500A-D may be used to allow processor 201 of FIG. 2 to determine that a user's body temperature during a call meets normal behavioral standards, thus causing it to generally allow a communication to proceed without further action. For example, temperature curve 500A shows a scenario that typically takes place during call initiation. At times prior to $t_1$, temperature sensor 202 is detecting the ambient temperature TEMP1 of the room where the communication device is located. At $t_1$, a user picks up a telephone handset (or other element where temperature sensors are located), for instance, and the temperature detected by sensor 202 rises to the user's body temperature TEMP2. The call is then typically initiated sometime after $t_1$ or $t_2$.

Temperature curve 500B shows another scenario where the user moved his or her hand with respect to the telephone handset (e.g., between areas 301 and 302 in FIG. 3A) or switched the handset between the right and left hands during a call. Particularly, prior to $t_1$, temperature sensor 202 detects the user's body temperature TEMP2. At $t_1$, however, the user momentarily moves his or her hands, and at $t_2$ the temperature sensed by sensor 202 has dropped to TEMP1 (i.e., any temperature between the user's body temperature and the ambient temperature). Then, by time $t_3$, the temperature detected by sensor 202 returns to the same user's body temperature TEMP2.

Temperature curve 500C shows a scenario where the user's body temperature fluctuates during a call due to the stressful content of the communication. At time $t_1$, sensor 202 detects the user's body temperature TEMP1. At time $t_2$, sensor 202 detects the user's body temperature as TEMP2, which is slightly higher than TEMP1, thus potentially indicating a stressful call or communication. At time $t_3$, sensor 202 detects the user's body temperature TEMP1, thus indicating a return to normal stress levels. In this case, depending upon the magnitude of the temperature fluctuation (e.g., above a threshold), processor 201 may flag the call as an important communication for subsequent investigative purposes. Similarly, curve 500D shows a scenario where, at time $t_1$, sensor 202 detects the user's body temperature TEMP1. At time $t_2$, sensor 202 detects the user's body temperature as TEMP2, which is slightly lower than TEMP1, thus also potentially indicating a stressful call or communication. At time $t_3$, sensor 202 detects the user's body temperature TEMP1, thus indicating a return to normal levels. Again, depending upon the magnitude of the fluctuation, processor 201 may flag the call for subsequent investigative purposes.

FIGS. 6A-D are graphs illustrating examples of abnormal temperature curves. In some embodiments, temperature curves 600A-C may be used to allow processor 201 of FIG. 2 to determine that a user's body temperature during a call does not meet normal behavioral standards, thus causing it to take some form of corrective action (e.g., terminating the call, triggering an alert, etc.). For example, temperature curve 600A shows a call taking place after time $t_1$, where the temperature TEMP1 measured by sensor 202 does not change during the progress of the call and/or is the same as the ambient temperature (e.g., as measured by reference sensor 204). This temperature signature may indicate, for example, that an inmate is not holding a handset at all or is otherwise outside the range of sensor(s) 202 (e.g., using a thermally insulating material to hold the handset where the sensors are located).

Temperature curve 600B shows that, at time $t_1$, sensor 202 measures the user's body temperature as TEMP2. At time $t_2$, sensor 202 measures the user's temperature as any arbitrary low value, and at time $t_3$ it measures the user's temperature as TEMP1 different from TEMP2. If the difference between TEMP2 and TEMP1 is outside of a predetermined threshold, this temperature signature may indicate, for example, that an inmate has given a handset over to another inmate (with a different temperature profile). Conversely, if the difference between TEMP2 and TEMP1 falls within the threshold such that TEMP1 is very similar to TEMP2, then curve 600B becomes similar to curve 500B of FIG. 5B, thus indicating that the original inmate is likely still handling the handset.

Temperature curve 600C shows that, at time $t_1$, sensor 202 measures the user's body temperature as TEMP1. At time $t_2$, sensor 202 measures the user's temperature as any arbitrarily lower value, and at time $t_3$ it measures the user's temperature as TEMP2 different from TEMP1. Again, if the difference between TEMP2 and TEMP1 is outside of a predetermined threshold, this signature may indicate that an inmate has given a handset over to another inmate. Temperature curve 600D shows a situation where a call is taking place prior to time $t_1$ while sensor 202 is picking up the user's body temperature TEMP2. Then, while the call is still in progress at time $t_2$, sensor 202 detects a temperature drop to TEMP1 (e.g., ambient temperature) thus potentially indicating, for example, that the handset is hanging freely from the communication device.

Referring to FIGS. 5A-D and 6A-D, it should be noted that the information presented therein is shown for ease of explanation only. Various other temperature curves representing normal and/or abnormal behavior may be developed for any given environment or application. In some cases, one or more of temperature curves 500A-D and/or 600A-D may be learned based upon a sample of communications where normal and/or abnormal events are known. Also, these examples refer to the use of sensors in a telephone handset for sake of illustration, but it should be understood that similar conclusions may be drawn regardless of where temperature sensors are located in the communication device, as discussed in connection with FIGS. 3A-C.

Figure 6A:
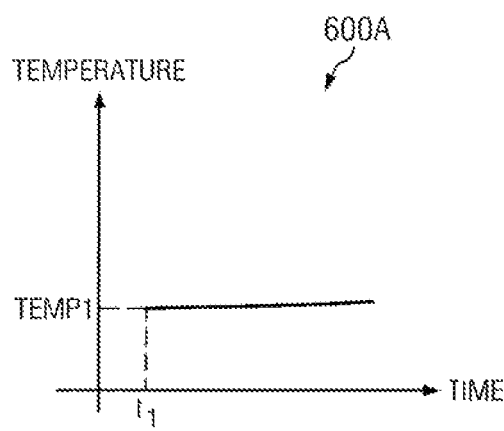
FIGS. 6A-D are graphs illustrating examples of temperature curves indicative of abnormal behavior according to some embodiments.
Figure 6B:
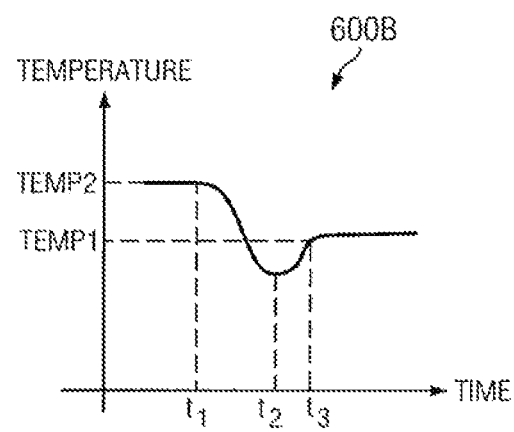
Figure 6C:
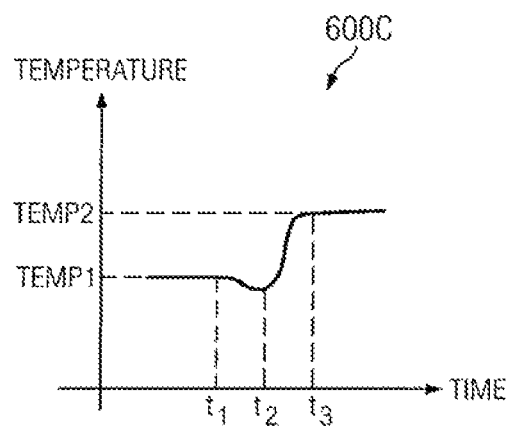
Figure 6D:
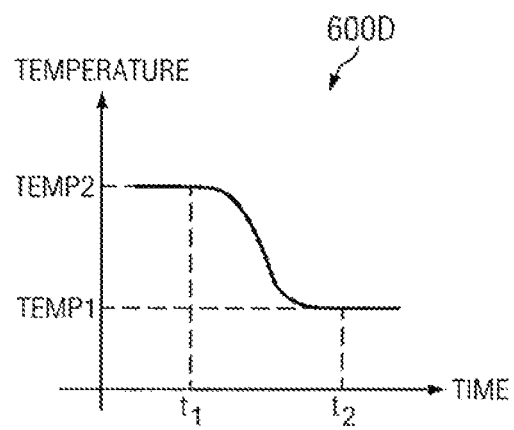

In some implementations, data representing one or more of curves 500A-D and/or 600A-C may be stored in memory 205 and used by processor 201 in making call control determination(s). For instance, in some cases, sensor(s) 202 may take periodic temperature measurements and processor 201 may plot curves against which one or more of curves 500A-D and/or 600A-D may be compared. In other cases, however, the data of curves 500A-D and/or 600A-D may be represented as a set of threshold values against which measured data is compared. For example, processor 201 may receive a first temperature at a first time during a communication and a second temperature at a second time during the communication. Then processor 201 may compare a difference between the first and second temperatures against one or more temperature thresholds stored in memory 205 (e.g., a temperature difference threshold characteristic of curve 600B in FIG. 6B is likely to be larger than a temperature difference threshold of curve 500B in FIG. 5B). Processor 201 may also compare a difference between the first and second times against one or more time thresholds, also stored in memory 205 (e.g., a time difference threshold characteristic of curve 600B in FIG. 6B is likely to be larger than a time difference threshold of curve 500C in FIG. 5C).

Accordingly processor 201 may determine whether the measured temperatures fit one or more temperature signatures based on these comparisons. In some cases, particular combinations of temperature and time thresholds may give rise to an inference that a particular one of a predetermined number of events took place at the communication device (e.g., phone hand off, use of insulating materials, attempt to use handset as speakerphone, etc.). Thus, in addition to taking appropriate call control action, processor 201 may also record an indication of which event is likely to have taken place, for example, in a Call Detail Record (CDR) or the like.

Figure 7A:
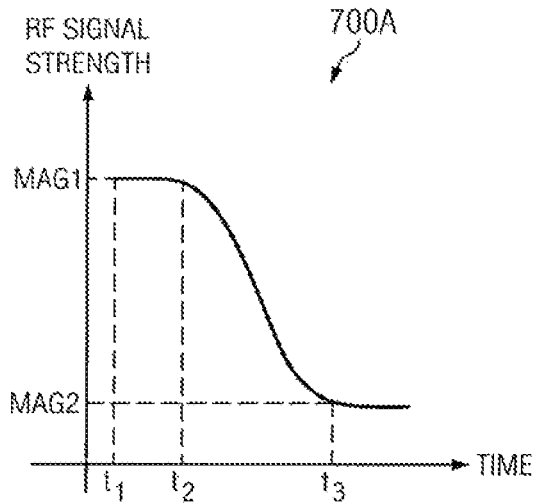
FIGS. 7A and 7B are graphs illustrating examples of an RF signal curves indicative of abnormal behavior according to some embodiments.
Figure 7B:
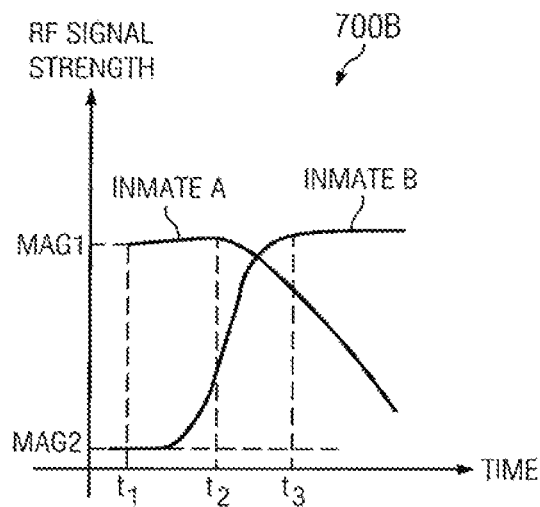

FIGS. 7A and 7B are graphs illustrating examples of abnormal RF signal curves according to some embodiments. As with temperature curves 600A-D, here RF curves 700A and 700B may be used to allow processor 201 of FIG. 2 to determine that a user's RF signal strength during a call does not meet normal behavioral standards, thus causing it to take some form of corrective action (e.g., terminating the call, triggering an alert, etc.). Curve 700A shows that, at time $t_1$, RF sensor 203 determines that the signal strength of an RF emitter attached to an inmate is MAG1. At time $t_2$, the magnitude of the signal strength starts dropping until it reaches MAG2 at time $t_3$. Here, if the difference between MAG2 and MAG1 is outside of a predetermined threshold, this RF signal signature may indicate, for example, that an inmate has walked away from the handset while the communication is still in progress, thus indicating an abnormality.

In some implementations, inmates may be wearing RFID or NFC tags, chips, or the like, such that, in addition to signal strength information, processor 201 and RF sensor 203 may be able to determine the identity of nearby inmates. Curve 700B illustrates a situation where inmate A is operating a communication device at time $t_1$, and thus sensor 203 detects a signal strength of magnitude MAG1. At this point, inmate B is far away from sensor 203 and therefore the signal strength of its RF device may be at MAG2, if at all detectable. Between times $t_2$ and $t_3$, however, the signal strength of the RF device of inmate A drops while the signal strength of the RF device of inmate B increases to MAG1, thus indicating that inmate B is now operating the communication device while the original communication is still ongoing, and thus indicating another abnormality.

Similarly as stated above, the information presented in FIGS. 7A and 7B are also shown for ease of explanation only. Various other RF curves representing normal and/or abnormal behavior may be developed for any given environment or application. In some implementations, data representing one or more of curves 700A or 700B (e.g., one or more threshold values) may be stored in memory 205 and used by processor 201 in making call control determinations, in a manner similar to the temperature examples of FIGS. 5A-D and/or 6A-D. Moreover, a learning algorithm may be implemented such that curves 700A and/or 700B are developed based upon actual communications where normal and/or abnormal events are known.

Figure 8A:
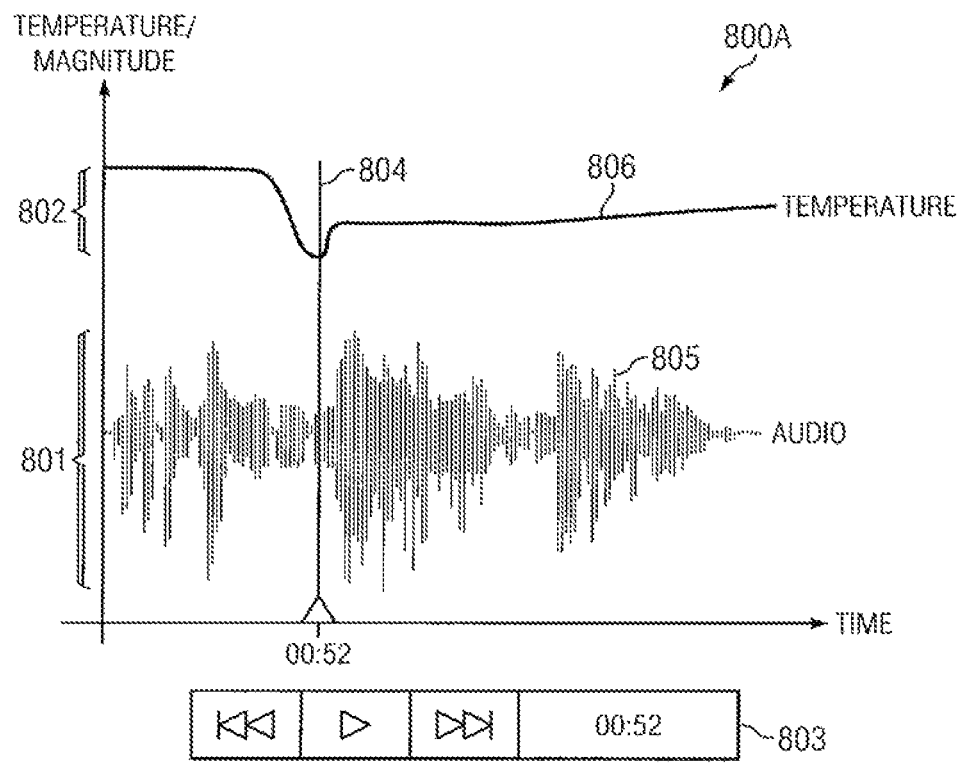
FIGS. 8A and 8B are screenshots of audio playback tools according to some embodiments.
Figure 8B:
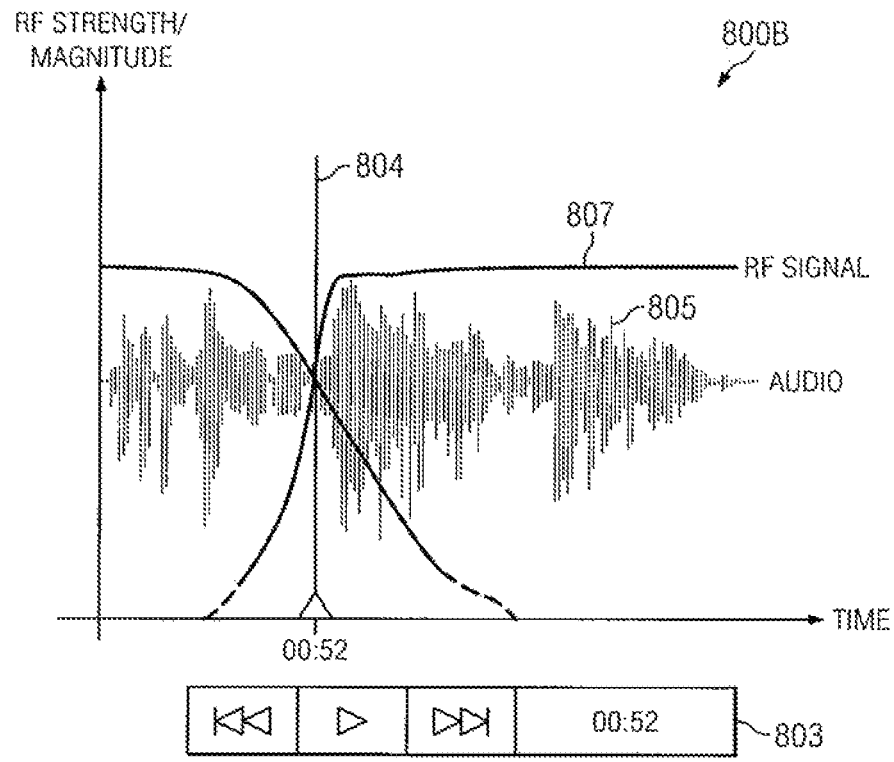

FIGS. 8A and 8B are screenshots of audio playback tools 800A and 800B. In some embodiments, tools 800A and/or 800B may be provided, at least in part, by processor 201 shown in FIG. 2. Additionally or alternatively, tools 800A and/or 800B may be provided via a graphical user interface (GUI) of a computer system (e.g., system 400 of FIG. 4) or the like. Particularly, FIG. 8A shows tool 800A where audio signal 805 is shown in an audio portion 801 of a screen, and where temperature signal 806 is shown in temperature portion 802 of the screen. Active playback controls 803 may be provided to allow a user to navigate curves 805 and 806, and to reproduce audio content of signal 805. In some cases, where temperature curve 806 indicates improper or suspicious behavior, tool 800A may highlight the relevant portion(s) of audio signal 805 (e.g., with a different color, etc.). For example, playhead indicator 804 may automatically provide a graphical indication of which point in audio signal 805 should be subject to further investigative review. In this example, temperature curve 806 resembles curve 600B shown in FIG. 6B, thus indicating that, at point t=00:52 s, an inmate may have given a handset over to another inmate with a different temperature profile.

FIG. 8B shows tool 800B where RF curve 807 is overlaid upon audio signal 805 in the same portion of the screen. Again, where RF curve 807 indicates improper or suspicious behavior, tool 800A may highlight the relevant portion(s) of audio signal 805 in any suitable manner. For sake of illustration, in this example, RF curve 807 resembles curve 700B shown in FIG. 7B, thus indicating that, at point t=00:52 s, an inmate may have given a handset over to another inmate. Thus, in some cases, upon opening an audio file containing audio signal 805, playhead indicator 804 may be automatically placed at t=00:52 s.

Figure 9:
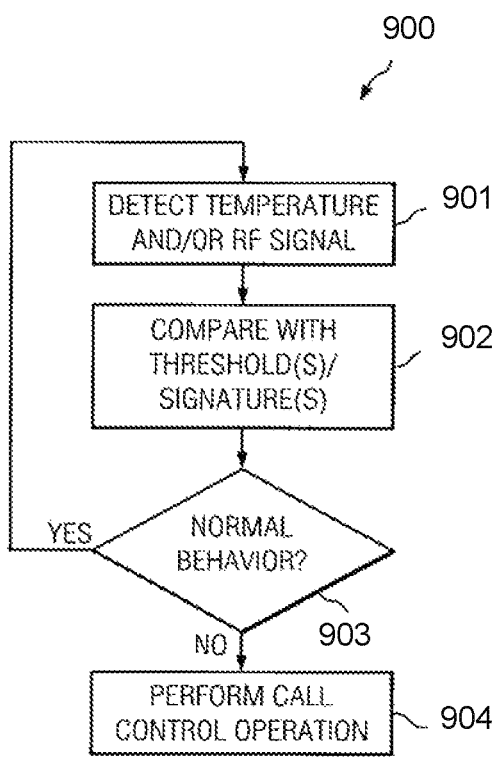
FIG. 9 is a flowchart of a method of controlling communications using temperature and/or RF signals according to some embodiments.

FIG. 9 is a flowchart of a method of controlling communications using temperature and/or RF signals. In some embodiments, method 900 may be performed, at least in part, by the apparatus shown in FIGS. 1-4. At block 901, method 900 detects a temperature and/or an RF signal, for example using sensor(s) 202 and/or 203 of FIG. 2. At block 902, method 900 compares the detected temperature and/or RF signal with one or more curves or signatures such as, for example, those shown in FIGS. 5A-D, 6A-D, 7A, and/or 7B. Such a comparison may be made, for instance, as a series of differences and predetermined thresholds and/or as a curve-to-curve comparison. At block 903, method 900 determines whether the comparison indicates a normal user behavior. If so, control returns to block 901. Otherwise, at block 904, method 900 may perform one or more communication control operations discussed above.

The various systems and methods illustrated in the figures and described herein represent example embodiments of systems and methods for controlling communications using temperature and/or RF signals. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method for detecting a transfer of a communication device by a first individual wearing a first RF (Radio Frequency) device to a second individual wearing a second RF device during a communication session using the communication device, the method comprising:

hosting, by the communication device, the communication session by the first individual wearing the first RF device, wherein the first individual has been authenticated for use of the communication device;

detecting, by the communication device in use by the authenticated first individual, a first signal from the first RF device, wherein a strength of the first signal indicates a distance between the communication device and the first RF device;

detecting, by the communication device in use by the authenticated first individual, a second signal from a second RF device within a proximity to the communication device during the communication session by the authenticated first individual;

detecting a decrease in the strength of the first signal from the first RF device in conjunction with detecting the second RF device within the proximity to the communication device; and in response to detecting the decrease in the strength of the first signal in conjunction with detecting the proximity of the second RF device to the communication device, signaling a detected transfer of the communication device from the first individual to the second individual.

2. The method of claim 1, wherein the detected decrease in the strength of the first signal from the first RF device exceeds a margin of signal strength fluctuations indicating normal use of the communication device.

3. The method of claim 1, further comprising:
detecting an increase in a strength of the second signal from the second RF device contemporaneous with the detected decrease in the strength of the first signal from the first RF device.

4. The method of claim 3, further comprising:
identifying the second individual wearing the second RF device.

5. The method of claim 1,
wherein the communication session comprises a voice communication between the first individual and a third individual.

6. The method of claim 1, further comprising:
initiating live monitoring of the communication session in response to the detected transfer from the first individual to the second individual.

7. The method of claim 1, further comprising:
generating an interface for monitoring an audio portion of the communication session in response to the detected transfer of the communication device from the first individual to the second individual.

8. A system for detecting a transfer of a communication device by a first individual wearing a first RF (Radio Frequency) device to a second individual wearing a second RF device during a communication session using the communication device, the system comprising:
a communications system hosting, by the communication device, the communication session by the first individual using the communication device, wherein the first individual has been authenticated for use of the communication device;
a first RF device worn by the first individual authenticated for use of the communication device; and
the communication device comprising capabilities supporting voice communications, wherein the communication device is configured to:
detect a first signal from the first RF device, wherein a strength of the first signal indicates a distance between the communication device and the first RF device while the communication is in use by the authenticated first individual;

detect a second signal from a second RF device within a proximity to the communication device during the communication session by the authenticated first individual;
detect a decrease in the strength of the first signal from the first RF device in conjunction with detecting the second RF device within the proximity to the communication device; and
in response to detecting the decrease in the strength of the first signal in conjunction with detecting the proximity of the second RF device to the communication device, signal a detected transfer of the communication device from the first individual to the second individual.

9. The system of claim 8, wherein the communication device comprises an RF sensor is embedded in the communication device, and wherein the RF sensor detects the first signal and the second signal.

10. The system of claim 8, wherein the detected decrease in the strength of the first signal from the first RF device exceeds a margin of signal strength fluctuations indicating normal use of the communication device.

11. The system of claim 8, wherein the RF sensor is further configured to:
detect an increase in a strength of the second signal from the second RF device contemporaneous with the detected decrease in the strength of the first signal from the first RF device.

12. The system of claim 11, wherein the communications system is configured to:
identify the second individual wearing the second RF device.

13. The system of claim 8, wherein the communication session comprises a voice communication between the first individual and a third individual.

14. The system of claim 8, wherein the communications system is further configured to:
initiate live monitoring of the communication session in response to the detected transfer from the first individual to the second individual.

15. The system of claim 8, wherein the communications system is further configured to:
generating an interface for monitoring an audio portion of the communication session in response to the detected transfer of the communication device from the first individual to the second individual.

16. A computer-readable storage device having program instructions stored thereon for detecting a transfer of a communication device by a first individual wearing a first RF (Radio Frequency) device to a second individual wearing a second RF device during a communication session using the communication device, upon execution by one or more processors, the program instructions cause the one or more processors to:
host, by the communication device, the communication session by the first individual wearing the first RF device, wherein the first individual has been authenticated for use of the communication device, and wherein the communication session comprise a voice call between the first individual and a third individual;
detect a first signal from the first RF device, wherein a strength of the first signal indicates a distance between the communication device and the first RF device;
detect a second signal from a second RF device within a proximity to the communication device during the communication session by the authenticated first individual;

detect a decrease in the strength of the first signal from the first RF device in conjunction with detecting the second RF device within the proximity to the communication device; and in response to detecting the decrease in the strength of the first signal in conjunction with detecting the proximity of the second RF device to the communication device, signal a detected transfer of the communication device from the first individual to the second individual.

17. The computer-readable storage device of claim 16, wherein the detected decrease in the strength of the first signal from the first RF device exceeds a margin of signal strength fluctuations indicating normal use of the communication device.

18. The computer-readable storage device of claim 16, the program instructions further causing the one or more processors to:

detect an increase in a strength of the second signal from the second RF device contemporaneous with the detected decrease in the strength of the first signal from the first RF device.

19. The computer-readable storage device of claim 18, the program instructions further causing the one or more processors to:

identify the second individual wearing the second RF device.

20. The computer-readable storage device of claim 19, wherein the communication device comprises an RF sensor is embedded in the communication device, and wherein the RF sensor detects the first signal and the second signal.

* * * * *